US009523328B2

(12) United States Patent
Marrocco et al.

(10) Patent No.: US 9,523,328 B2
(45) Date of Patent: Dec. 20, 2016

(54) SYSTEM, METHOD AND TOOLING FOR FLEXIBLE ASSEMBLY OF CYLINDER-HEAD VALVE TRAINS

(71) Applicants: Ford Global Technologies, LLC, Dearborn, MI (US); ABB Technology AG, Zurich (CH)

(72) Inventors: Alexander Marrocco, Windsor (CA); Harry Kekedjian, Tecumseh (CA); Isaac Zolotarev, Farmington Hills, MI (US); Arnold Bell, Auburn Hills, MI (US); Michael Manuszak, Auburn Hills, MI (US)

(73) Assignees: Ford Global Technologies, LLC, Dearborn, MI (US); ABB Technologies AG, Zurich (CH)

( * ) Notice: Subject to any disclaimer, the term of this patent is extended or adjusted under 35 U.S.C. 154(b) by 256 days.

(21) Appl. No.: 14/190,320

(22) Filed: Feb. 26, 2014

(65) Prior Publication Data

US 2015/0240744 A1 Aug. 27, 2015

(51) Int. Cl.
*F02F 1/42* (2006.01)
*B23P 19/04* (2006.01)
(Continued)

(52) U.S. Cl.
CPC ............ *F02F 1/4285* (2013.01); *B23P 19/045* (2013.01); *F01L 1/462* (2013.01); *F01L 3/10* (2013.01);
(Continued)

(58) Field of Classification Search
CPC ..... B23P 15/001; B23P 19/042; B23P 19/043; B23P 19/045; B23P 2700/50; F05D 2230/60; F01L 3/10; F01L 2103/00; F01L 2103/01; Y10T 29/49231; Y10T 29/49233; Y10T 29/49256
See application file for complete search history.

(56) References Cited

U.S. PATENT DOCUMENTS 5,357,675 A * 10/1994 Danmoto .............. B23P 19/045
29/464
5,761,785 A 6/1998 Connolly
(Continued)

FOREIGN PATENT DOCUMENTS

CN 202668049 U 1/2013
JP S6224925 A 2/1987
(Continued)

OTHER PUBLICATIONS

Great Britain Search Report for corresponding Application No. GB1503029.9, Jul. 6, 2015, 1 page.

*Primary Examiner* — Christopher Besler
(74) *Attorney, Agent, or Firm* — Brooks Kushman P.C.; Damian Porcari

(57) ABSTRACT

An assembly method is provided by orienting a cylinder-head at a first orientation. A first plurality of spring caps and a first plurality of retainer keys are installed into the cylinder-head in the first orientation by a first robot. A first plurality of valves is installed into the cylinder-head in the first orientation by a second robot, into engagement with the first plurality of retainer keys. An end effector is provided with an actuator supported upon an adapter plate. A shaft extends from the actuator with a mating surface to engage a spring cap. Porting is provided through the shaft to convey pressurized air upon a plurality of retainer keys within the spring cap. A plurality of gripper fingers extend from the distal end of the shaft to grip a valve spring while retaining a spring cap between the valve spring and the mating surface of the shaft.

22 Claims, 15 Drawing Sheets

(51) Int. Cl.
    *F01L 1/46*      (2006.01)
    *F01L 3/10*      (2006.01)
(52) U.S. Cl.
    CPC ........ *B23P 2700/50* (2013.01); *F01L 2103/00* (2013.01); *F01L 2103/01* (2013.01); *Y10T 29/4927* (2015.01); *Y10T 29/53552* (2015.01)

(56) References Cited

U.S. PATENT DOCUMENTS

| | | |
|---|---|---|
| 8,079,143 B2 | 12/2011 | Zhang et al. |
| 8,607,426 B1 * | 12/2013 | Coggins ................. B23P 11/00 29/213.1 |
| 2002/0100159 A1 | 8/2002 | Swartz et al. |
| 2014/0290060 A1 | 10/2014 | Kikukawa et al. |

FOREIGN PATENT DOCUMENTS

| | | |
|---|---|---|
| JP | S6322234 A | 1/1988 |
| WO | 2008087702 A1 | 7/2008 |

* cited by examiner

SYSTEM, METHOD AND TOOLING FOR FLEXIBLE ASSEMBLY OF CYLINDER-HEAD VALVE TRAINS

TECHNICAL FIELD

Various embodiments relate to systems, methods and tooling for flexible assembly of valve trains of cylinder-head assemblies.

BACKGROUND

A cylinder-head is mounted to an internal combustion engine block for enclosing one or more cylinders and providing at least a portion of the combustion chamber. Depending on the cylinder configuration of the engine, one, two or more cylinder-heads may be employed. The cylinder-head is sealed to the engine block and often provides porting for feeding fuel and air to the cylinder, while also exhausting the post-combustion exhaust. The porting is often regulated by a valve train, which is often assembled to the cylinder-head. Thus a cylinder-head in combination with a valve train is often referred to as a cylinder-head assembly. The operation of the valve train is driven by at least one camshaft. In overhead camshaft designs, the camshaft is supported for rotation in the cylinder-head assembly.

The valve train often includes poppet valves which are received for reciprocating translation in valve guides in the cylinder-head. During assembly, a valve stem is inserted into a combustion side of the cylinder-head. After installation, a valve plug is typically maintained in the installed position by a fixture or automation. The cylinder-head is typically flipped over, and valve springs, spring caps, and retainer keys are installed to the valve stem. The springs are compressed, permitting the spring cap and retainer keys to translate along the valve stem until the keys engage a notch on the valve stem. The compression is released so that the spring engages the spring cap thereby loading the valve plug into engagement with the cylinder-head. Installation of the valve train was previously performed manually. Subsequently, the installation was automated with the valves installed at a separated cell or station than the valves springs, springs caps and retainer keys.

SUMMARY

According to at least one embodiment, an assembly method is provided by orienting a cylinder-head at a first orientation. A first plurality of spring caps and a first plurality of retainer keys are installed into the cylinder-head in the first orientation by a first robot. A first plurality of valves is installed into the cylinder-head in the first orientation by a second robot, into engagement with the first plurality of retainer keys.

According to at least another embodiment, an end effector is provided with an adapter plate. At least one actuator is supported upon the adapter plate. At least one shaft extends from the actuator. A mating surface is provided on a distal end of the shaft to engage a spring cap. Porting is provided through the shaft to a central region of the mating surface to convey pressurized air upon a plurality of retainer keys within the spring cap. A plurality of gripper fingers extend from the distal end of the shaft to grip a valve spring while retaining a spring cap between the valve spring and the mating surface of the shaft.

According to at least another embodiment, an automation system is provided with an automation assembly to orient a cylinder-head for assembly at a first orientation. A first robot is provided with a first tooling assembly to install spring caps and retainer keys into the cylinder-head in the first orientation. A second robot is provided with a second tooling assembly to install valves into the cylinder-head in the first orientation.

According to at least another embodiment, an assembly method provides a kitted assembly of cylinder-head valve-train components comprising a valve spring, a spring cap upon the valve spring and a plurality of retainer keys within a tapered aperture of the spring cap. An end effector is oriented over the kitted assembly so that a mating surface faces the spring cap. The end effector is translated towards the kitted assembly until the mating surface engages the spring cap such that a plurality of gripper fingers grip the valve spring. Pressurized air is conveyed through porting in the end effector to maintain an orientation of the retainer keys.

According to at least another embodiment, an assembly method provides an end effector for installing a valve spring, a spring cap upon the valve spring, and a plurality of retainer keys to a valve stem in a cylinder-head assembly. The end effector conveys pressurized air through porting toward the spring cap of the assembled valve stem, valve spring, spring cap and retainer keys. A pressure of the pressurized air is measure over time. The pressurized air measurements are compared to determine if the retainer keys are properly installed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
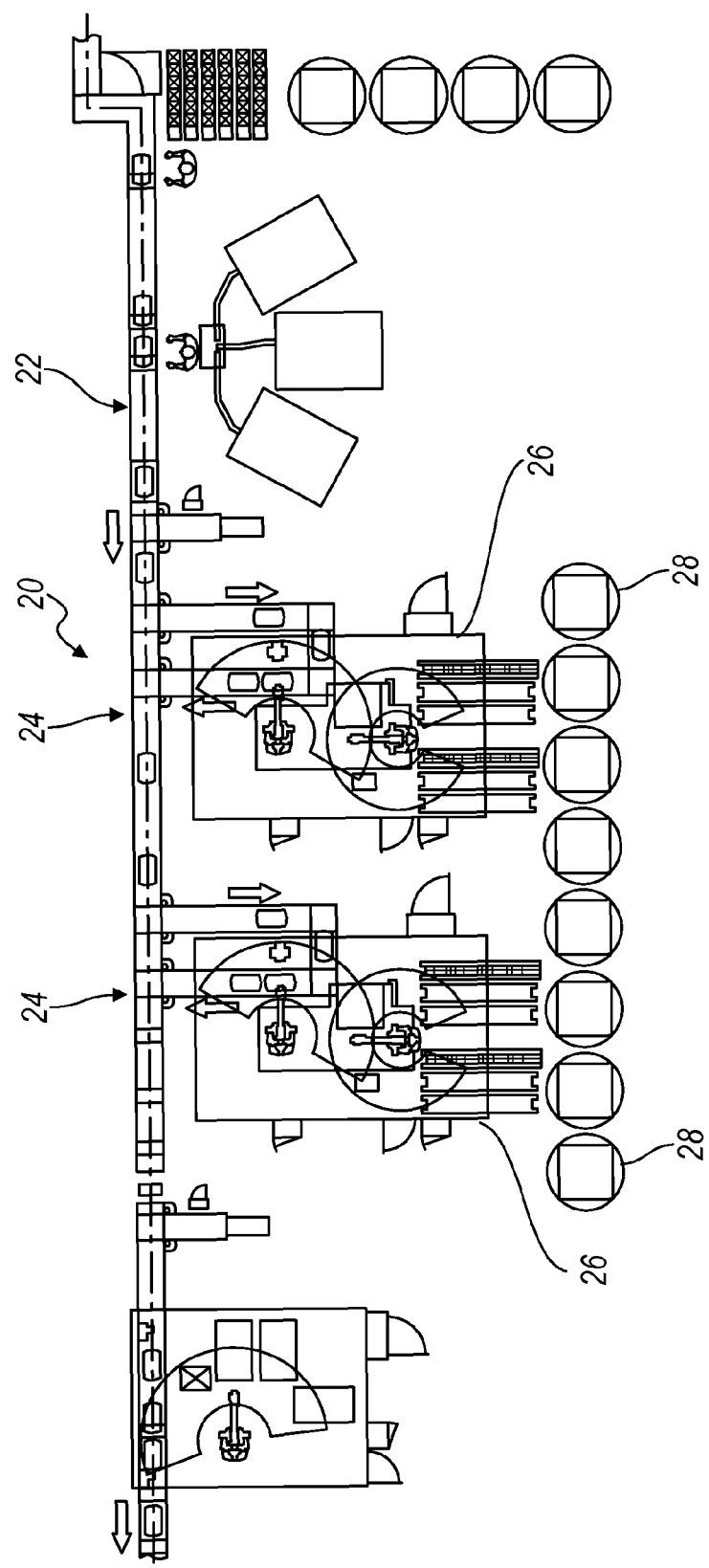
FIG. 1 is a top plan view of an assembly line according to an embodiment.

With reference to FIG. 1, an assembly line 20 is illustrated according to an embodiment. The assembly line 20 is for assembly of cylinder-head assemblies. The assembly line 20 may be dedicated to assembly of a single cylinder-head assembly, or may be configured, to assemble various cylinder-head assembly configurations. The latter option permits reuse of equipment and plant floor space without incurring duplicate expenses.

The assembly line 20 includes a conveyor system 22 for transporting cylinder-head assemblies along the assembly line 20. The cylinder-head assemblies may each be supported upon a pallet that is conveyed along the conveyor system 22. The conveyor system 22 transports each cylinder-head assembly to multiple stations or work cells for various incremental assembly operations. The pallets may also provide kitted components for subsequent assembly, such as valve springs, spring caps and retainer keys.

The assembly line 20 includes an assembly cell 24 for installation of a valve train to the cylinder-head assemblies. The assembly cell 24 is automated and is surrounded by perimeter guarding 26 to provide a physical barrier between passersby and the automation equipment. The conveyor system 22 extends into and out of the guarding 26 to present the cylinder-head assemblies to the assembly cell 24. The assembly cell 24 may also include additional secondary conveyor systems 28 for the introduction of additional assembly components, such as intake and exhaust valves into the assembly cell 24. Alternatively, the secondary conveyor systems may also supply the kitted valve springs, spring caps and retainer keys. In another alternative, the valves may be provided on the pallets thereby omitting the secondary conveyor system 28. The assembly line 20 may include a pair of redundant assembly cells 24 in order to duplicate a throughput of assembled cylinder-head assemblies, and to maintain production in case one of the cells 24 requires maintenance or repair.

Figure 2:
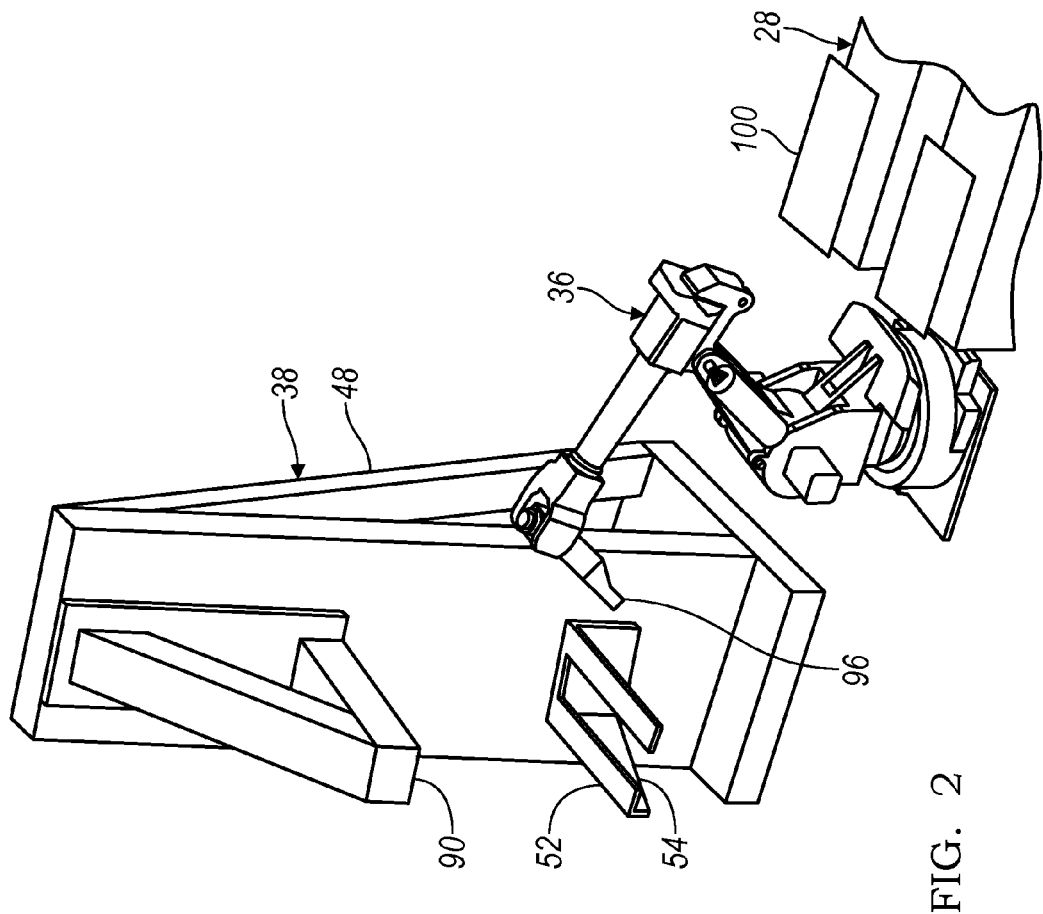
FIG. 2 is a perspective view of a flexible assembly cell of the assembly line of FIG. 1 according to an embodiment, illustrated in a first assembly position.
Figure 2:
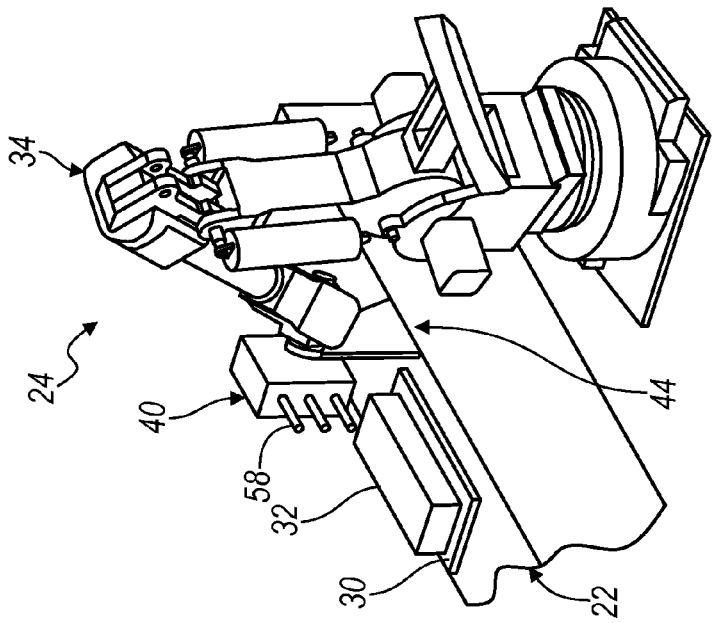
Figure 3:
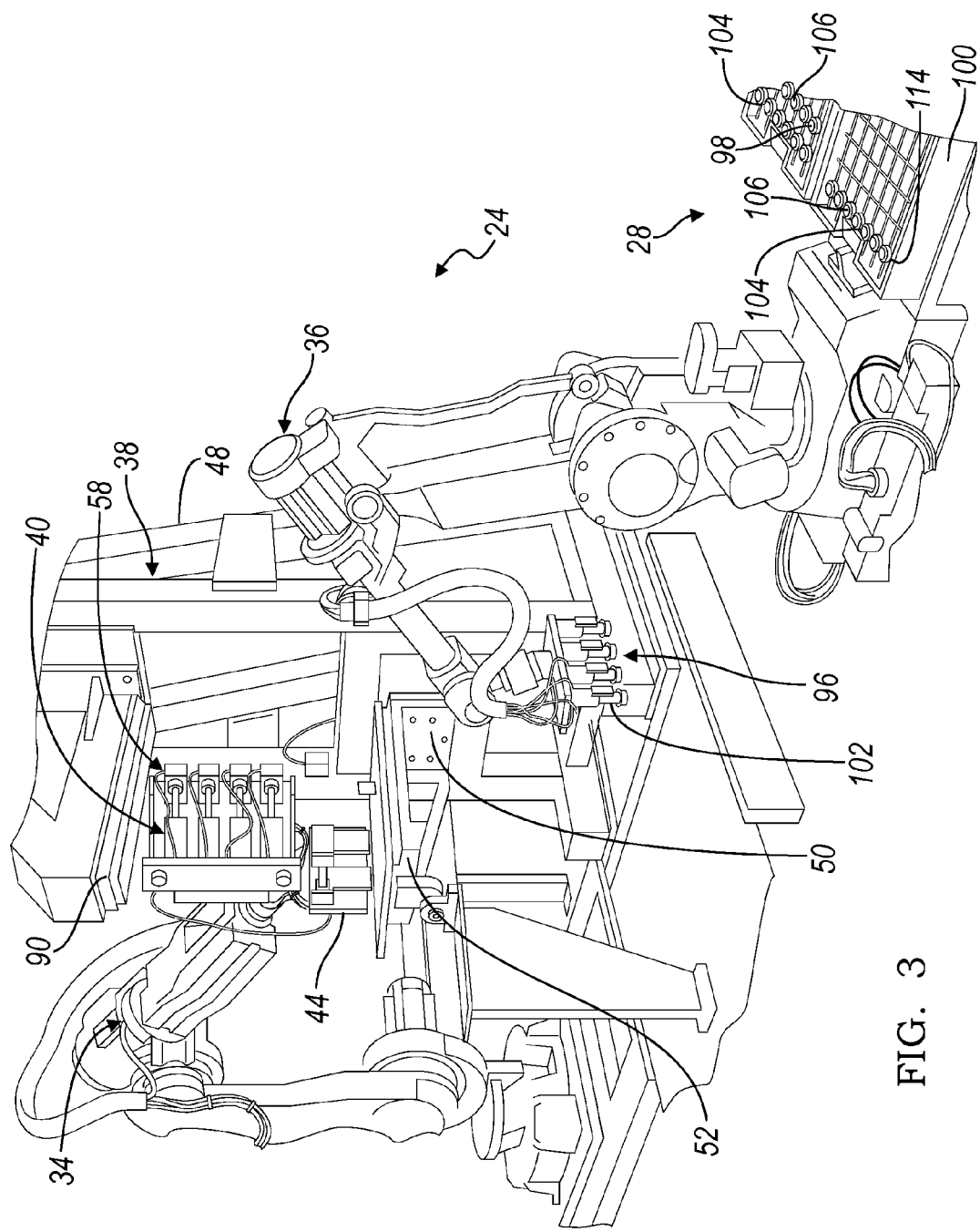
FIG. 3 is another perspective view of the flexible assembly cell of FIG. 2, illustrated in another assembly position.
Figure 4:
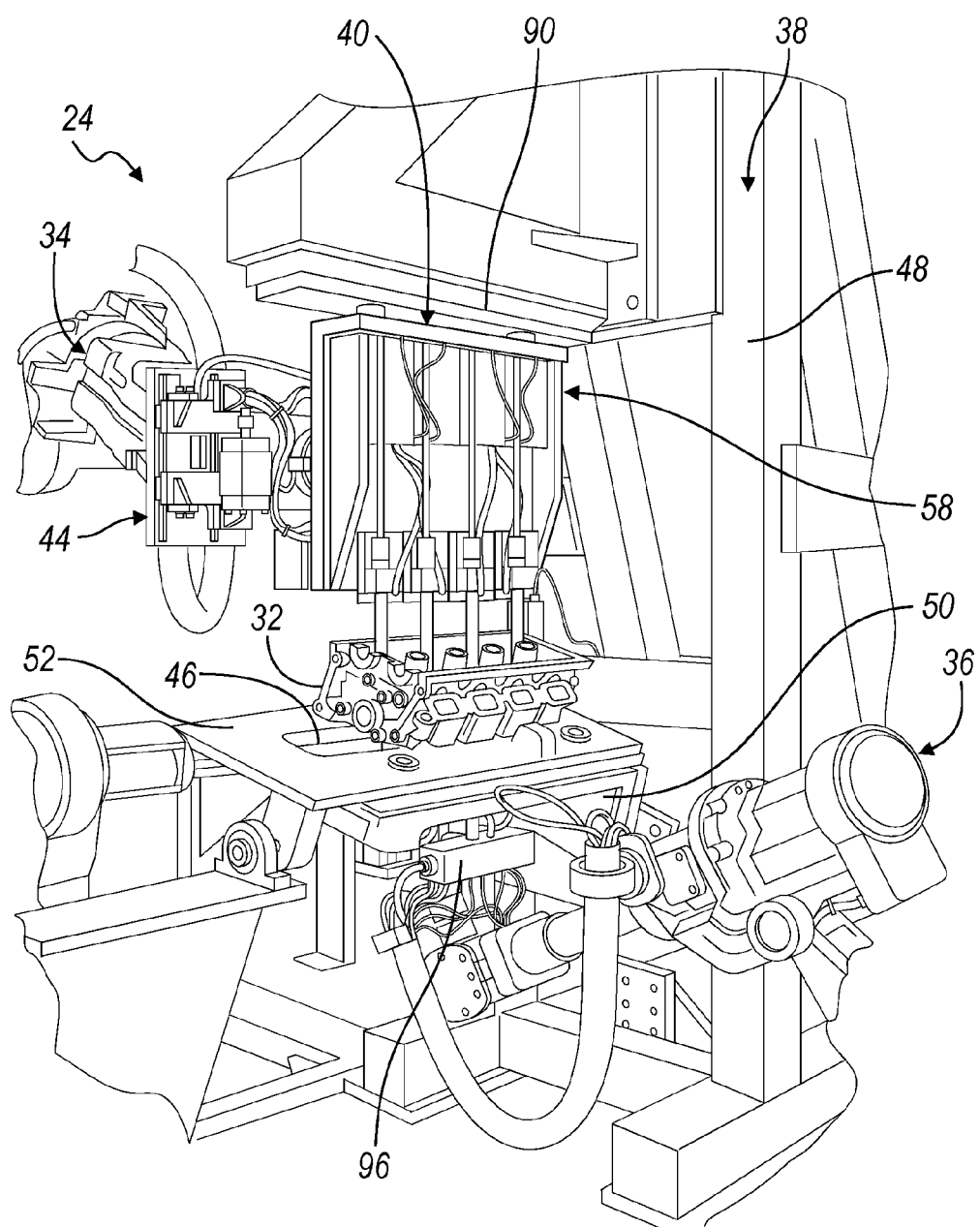
FIG. 4 is yet another perspective view of the flexible assembly cell of FIG. 2, illustrated in another assembly position.

FIGS. 2-4 illustrate one of the assembly cells 24 according to an embodiment. The cylinder-head assembly conveyor system 22 presents a pallet 30 with a cylinder-head 32 and kitted components into the assembly cell 24. The assembly cell 24 includes three automation assemblies; and according to the depicted embodiment, the automation assemblies include a primary industrial robot 34, a secondary industrial robot 36, and an automated fixture 38. The primary robot 34 transfers the pallet 30 and installs the kitted components. The secondary robot 36 installs the valves. The automated fixture 38 supports the cylinder-head 32 and presents the cylinder-head 32 at an orientation for the installations. Although two robots 34, 36 and one automated fixture 38 are illustrated and described, any combination of robots and fixtures is contemplated for providing the systems, methods and tooling.

Figure 5:
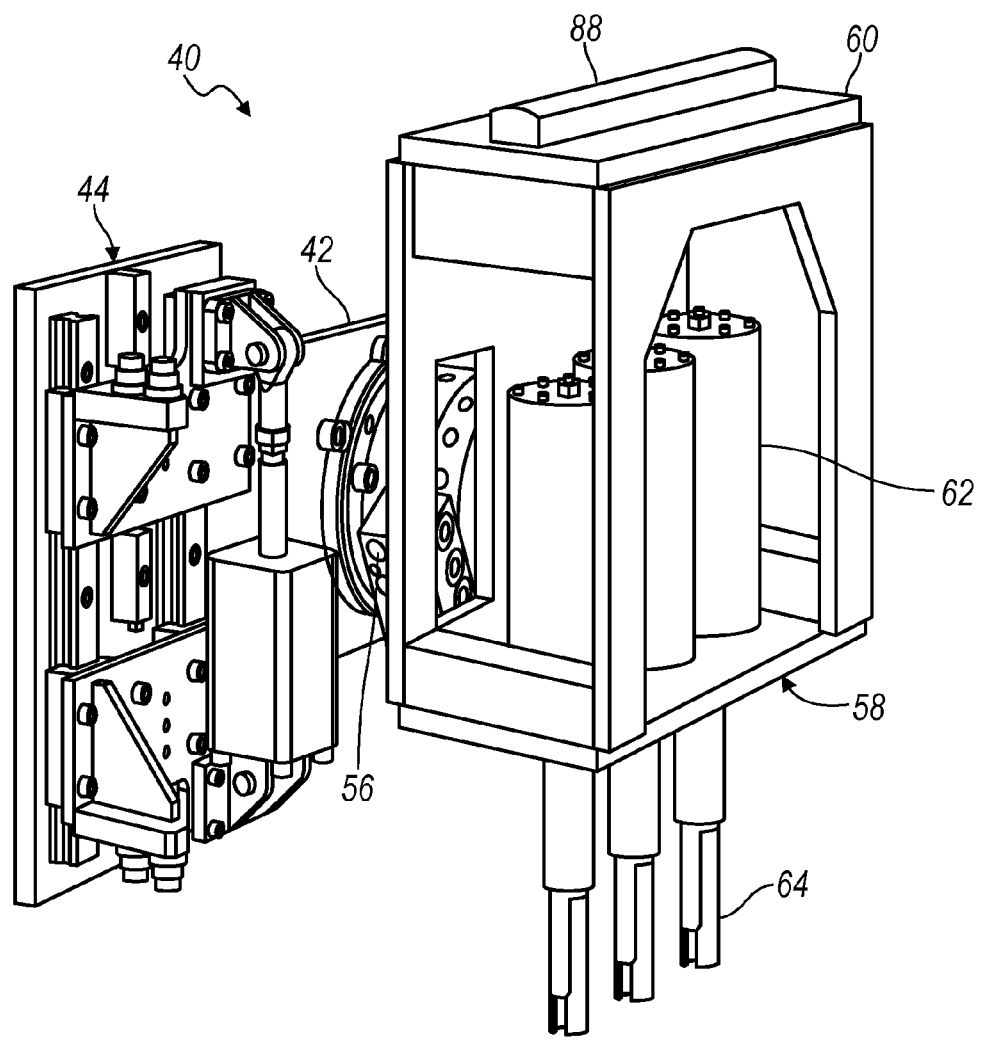
FIG. 5 is a perspective view of an end effector for the flexible assembly cell of FIG. 2, according to an embodiment.

The primary robot 34 is provided with an end effector 40 that is illustrated in greater detail in FIG. 5. The end effector 40 includes an adapter plate 42 for mounting the end effector 40 to the primary robot 34 as an end of arm tooling. The end effector 40 includes a pallet gripper assembly 44 for gripping pallets 30. Referring again to FIG. 2, the primary robot 34 grips the pallet 30 with the pallet gripper assembly 44. Then the primary robot 34 lifts the pallet 30, and places the pallet 30 on the automated fixture 38 as illustrated in FIG. 3.

The cylinder-head 32 is presented to the robots 34, 36 resting upon the engine side or combustion side of the cylinder-head 32. Unlike the prior art, the cylinder-head 32 is not flipped in order to install the valves. The pallet 30 includes a clearance aperture 46 for access to valve guides from beneath the cylinder-head 32.

The automated fixture 38 includes a support structure 48 such as an upright weldment for mounting to an underlying support surface. A rotary actuator 50, such as a servo motor, is supported by the support structure. A table 52 is pivotally mounted to the support structure 48 and driven by the rotary actuator for various angular positions relative to the support structure 48. The table 52 is a fixture for locating and supporting the pallet 30. The table 52 also includes a clearance aperture 54 for access to valve guides from beneath the cylinder-head 32.

After the pallet 30 and the cylinder-head 32 are placed upon the table 52, the rotary actuator 50 rotates the table 52 so that an array of valve guides is oriented vertically, or in other words perpendicular to the floor.

Referring again to FIG. 5, the end effector 40 of the primary robot 34 includes an interchangeable adapter 56 mounted to the adapter plate 42. The interchangeable adapter 56 permits the robot 34 to interchange tooling for various cylinder-head configurations, without requiring a manual tooling interchange. A tooling subassembly 58 is mounted to the interchangeable adapter 56 for installing valve springs, spring caps and retainer keys. The installation of these components is often referred to as key-up, and consequently, tooling for performing these operations is often referred to as key-up tooling.

FIGS. 4 and 5 illustrate various configurations of the key-up tooling subassembly 58. The key-up tooling subassembly 58 has a frame 60 mounted to the interchangeable adapter 56. A plurality of linear actuators 62 are mounted to the frame and spaced in a linear array, with the spacing aligned with a linear arrangement of valve spacing in the cylinder-head 32. For the depicted embodiment, the linear actuators 62 may be pneumatic cylinders; however, any suitable linear actuator is contemplated.

Figure 6:
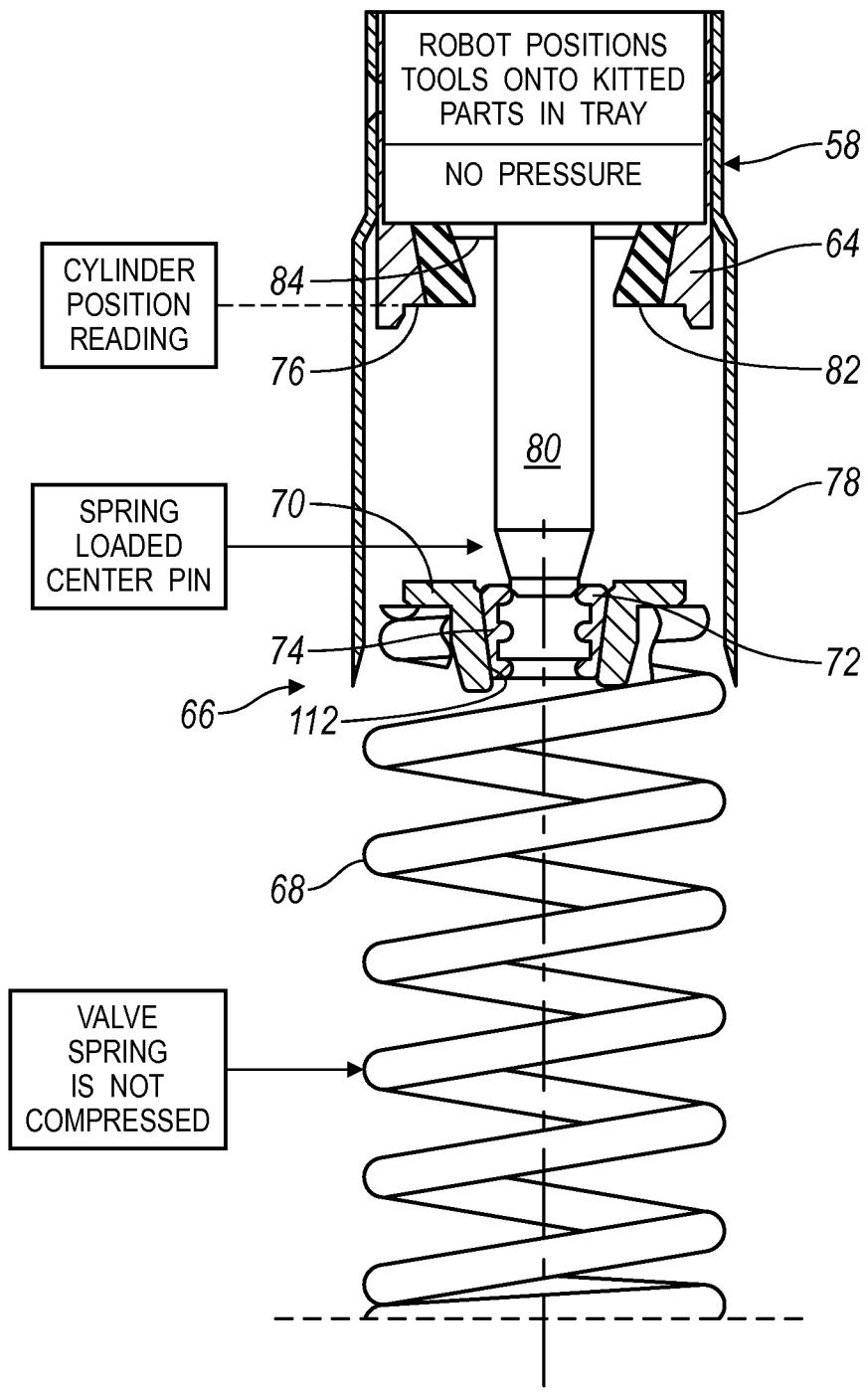
FIG. 6 is a partial section view of a gripper assembly of the end effector of FIG. 5, with a kitted valve spring, spring cap and retainer keys, illustrated in a first assembly position.

Referring now to FIGS. 5 and 6, each linear actuator 62 drives a shaft 64. In FIG. 6, the shaft 64 is illustrated approaching a kit 66 of valvetrain components. The linear actuators 62 are not pressurized at this time. The kit 66 includes a valve spring 68, a spring cap 70, and a pair of retainer keys 72. The retainer keys 72 each include three beads 74 for engagement into corresponding grooves in the valve stems. Of course any retainer key configuration is contemplated. As discussed above, the kits 66 are provided on the pallets 30 for the depicted embodiment.

Each shaft 64 has a mating surface 76 provided on a distal end of the shaft 64 to engage the spring cap 70. A pair of gripper fingers 78 is also mounted to the shaft 64; and the gripper fingers 78 are sized to grip the valve spring 68. A spring loaded center pin 80 extends from the shaft 64 and through the mating surface 76 of the shaft 64. The primary robot 34 orients the shaft 64 over and facing the kit 66. The primary robot 34 translates the key-up tooling subassembly 58 towards the kit 66 such that the center pin 80 engages the retainer keys 72. The center pin 80 maintains the retainer keys 72 in alignment during the installation process.

Figure 7:
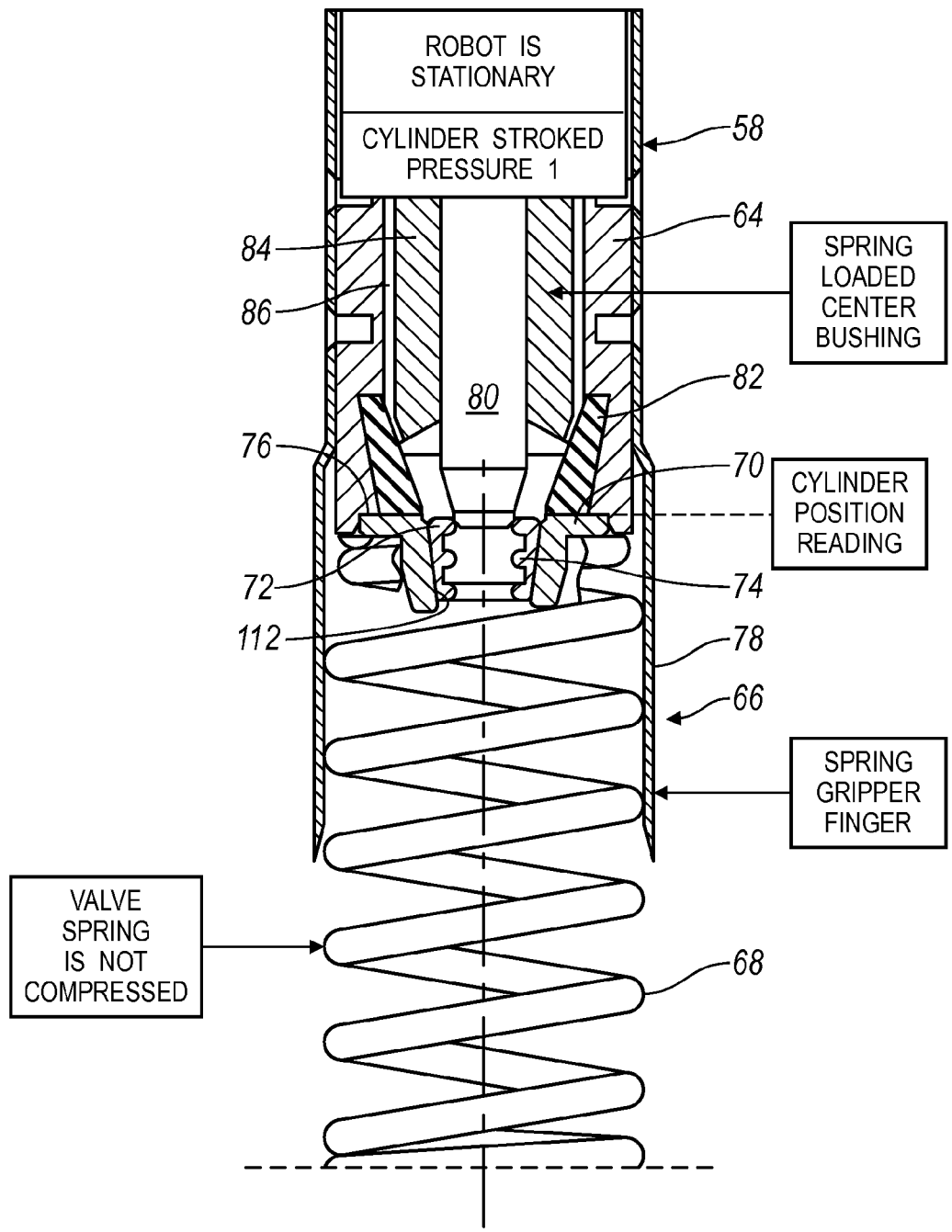
FIG. 7 is another partial section view of the gripper assembly and kit of FIG. 6, illustrated in a second assembly position.

The primary robot 34 further translates the key-up tooling subassembly 58 toward the kit 66 as illustrated in FIG. 7, thereby retracting the center pin 80 while maintaining the orientation of the retainer keys 72. The gripper fingers 78 are formed from a spring alloy and are undersized relative to the valve springs 68. As the gripper fingers 78 are pressed over the valve springs 68, the gripper fingers 78 expand and are loaded about the valve springs 68. The shaft 64 is translated until the mating surface 76 engages the spring cap 70 so that the gripper fingers 78 retain the valve spring 68, spring cap 70 and retainer keys 72 therein.

As illustrated in FIG. 7, a seal 82 is provided at the distal end of the shaft 64 for providing a fluid tight seal at the mating surface 76 with the spring cap 70. A spring loaded center bushing 84 is provided in the shaft 64 around the center pin 80. Porting 86 is provided about the center bushing 84 to provide a fluid passageway from the shaft 64 to the spring cap 70. According to one embodiment, the fluid passageway is pressurized to further maintain the retainer keys 72 in engagement with the spring cap 70 and the center pin 80 during travel of the end effector 40 and the kit 66. Alternatively, a vacuum source may be applied to the passageway to urge the retainer keys 72 against the mating surface 76 about the center pin 80. The actuators 62 may be stroked at an intermediate pressure, labeled as Pressure 1, for retrieval of the kit 66.

Referring again to FIG. 4, the primary robot 34 aligns the kits 66 with the valve guides in the cylinder head 32. A reaction bar 88 is provided upon the frame 60 of the key-up tooling subassembly 58. Likewise a stationary reaction beam 90 extends from the support structure 48 of the automated fixture 38. The primary robot 34 raises the end effector 40 so that the reaction bar 88 engages the reaction beam 90. Due to rotated position of the table 52, and consequently the cylinder-head 32, the valve guides are perpendicular to the reaction beam 90 to provide a reaction force while compressing the valve springs 68. By distributing the reaction force to a static structure, the reaction forces are not distributed to the robot 34.

Figure 8:
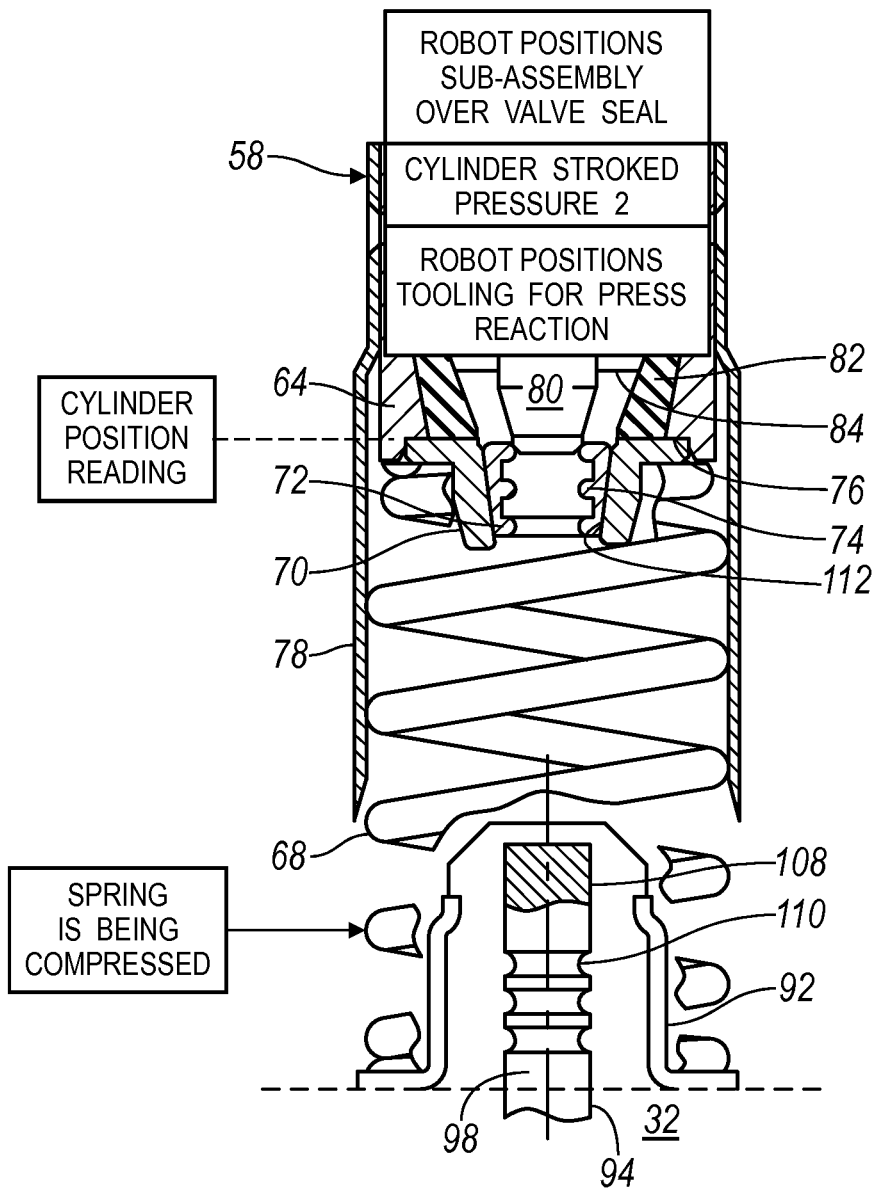
FIG. 8 is a partial section view of the gripper assembly and kit of FIG. 6 illustrated in a first assembly position during installation to a valve stem in a cylinder-head assembly.

Then, the linear actuators 62 are actuated by another intermediate pressure, labeled Pressure 2, which is greater than Pressure 1, thereby extending the shafts 64 as illustrated in FIG. 8. In this position, the spring cap 70 is pressed against the valve spring 68, thereby compressing the valve spring 68 against a valve seal 92 disposed about a valve guide 94 in the cylinder-head 32. Unlike the prior art, the valve stem is not yet present during this compression of the valve spring 68 thereby avoiding misalignment caused by engagement of the valve stem with the retainer keys 72.

With reference again to FIGS. 2-4, the secondary robot 36 has an end effector 96 for retrieving valves 98 from dunnage 100 on the valvetrain component conveyor system 28. The end effector 96 may apply vacuum cups 102 to combustion surfaces 104 of plugs 106 of the valves 98 for handling. In the first rotated position of the table 52, the intake valve guides 94 are oriented generally vertical. Therefore, the secondary robot 36 selects intake valves 98 and inserts the intake valves 98 into the valve guides 94 through the clearance provided in the apertures 46, 54 in the pallet 30 and the table 52.

Figure 9:
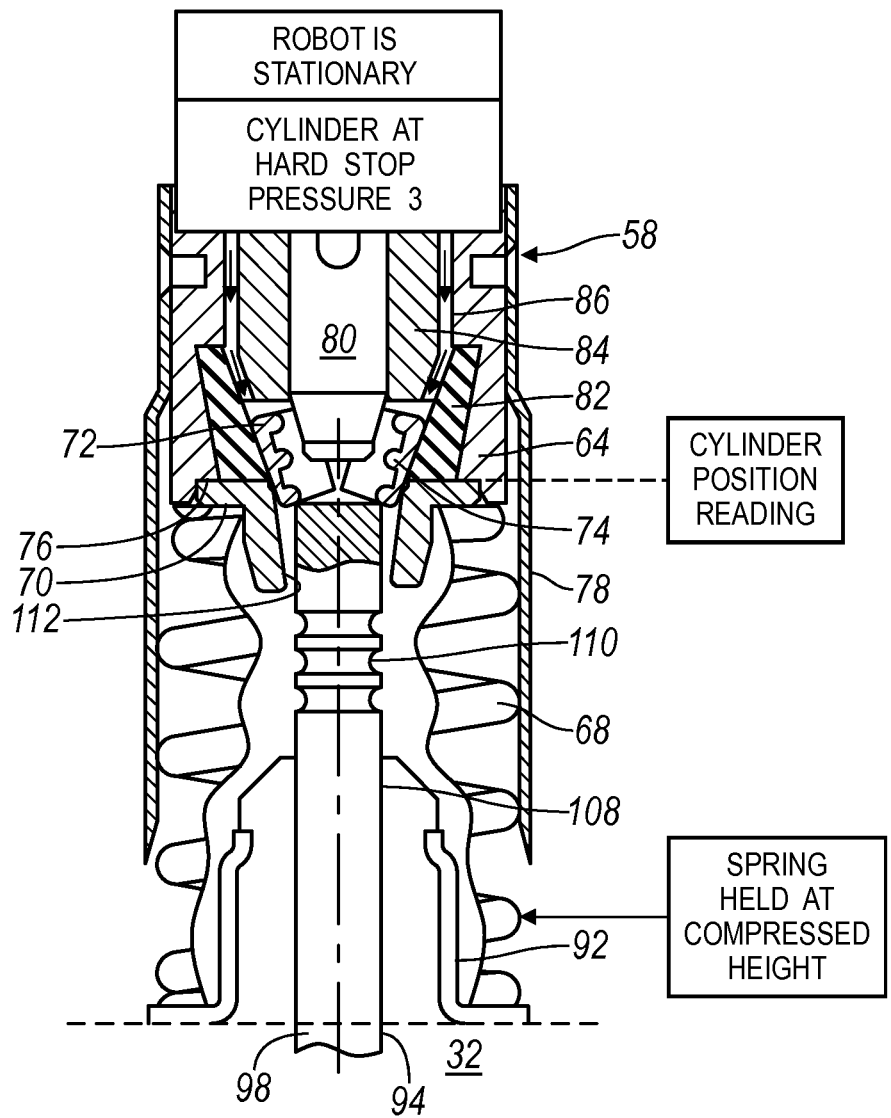
FIG. 9 is another partial section view of the gripper assembly, kit and cylinder-head assembly of FIG. 8, illustrated in another assembly position.

Referring again to FIG. 8, the secondary robot 36 presses the valves 98 into the valve guides 94. The translation may be provided by the secondary robot 36, or by an actuator or an array of actuators on the secondary end effector 96. As illustrated in FIG. 9, the secondary robot 36 continues to translate the valves 98 until a valve stem 108 extends past the valve seal 92 into engagement with the retainer keys 72. Additionally, the actuators 62 are pressurized to Pressure 3, which is greater than Pressure 2 so that the springs 68 are further compressed, and the actuators 62 reach a hard stop or a limit for full actuation.

Figure 10:
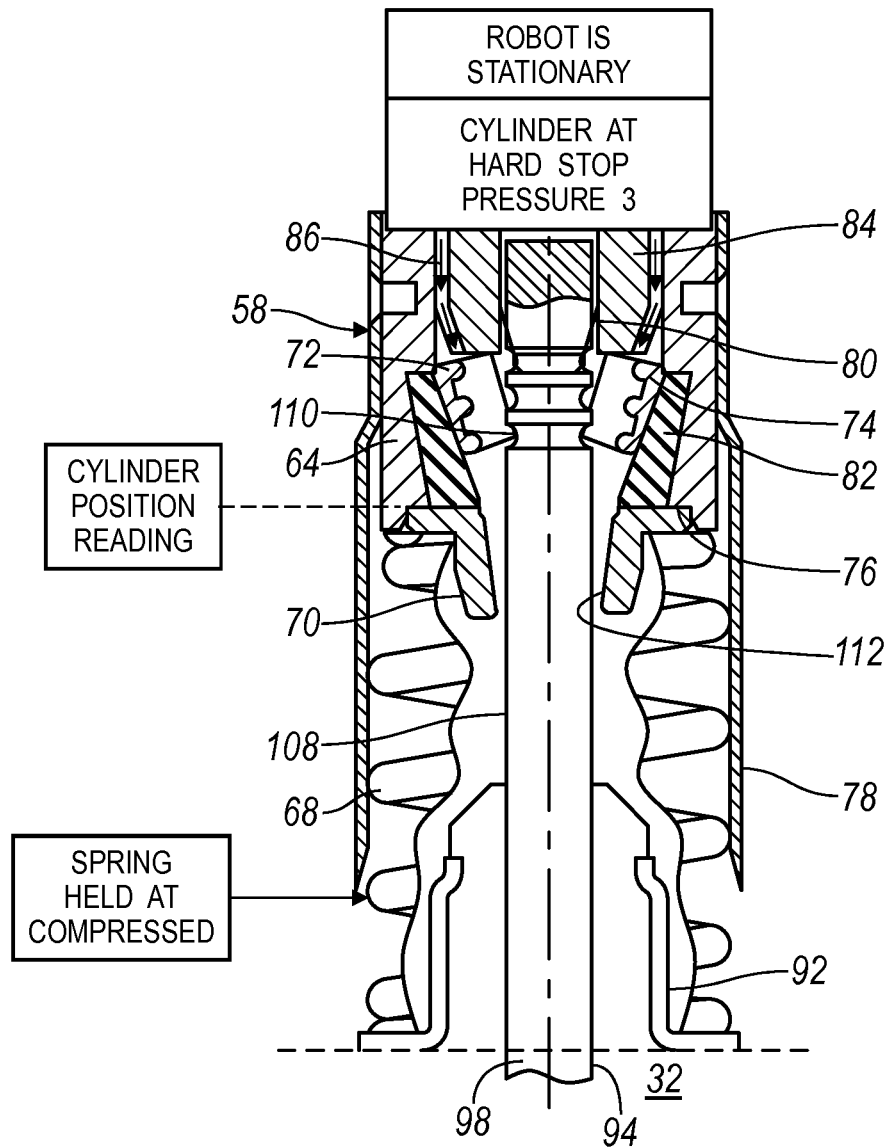
FIG. 10 is another partial section view of the gripper assembly, kit and cylinder-head assembly of FIG. 8, illustrated in yet another second assembly position.

Further advancement of the valve stem 108 presses retainer keys 72 through the pressurized air into engagement with the center bushing 84 in FIG. 10, while the valve stem 108 contacts and retracts the center pin 80 until the valve plug 106 is seated in the combustion surface of the cylinder-head 32. The center pin 80 has a range of translation to accommodate for variations in tolerance in the length of the valve stems 108. The actuators 62 are maintained at Pressure 3 during this step.

Figure 11:
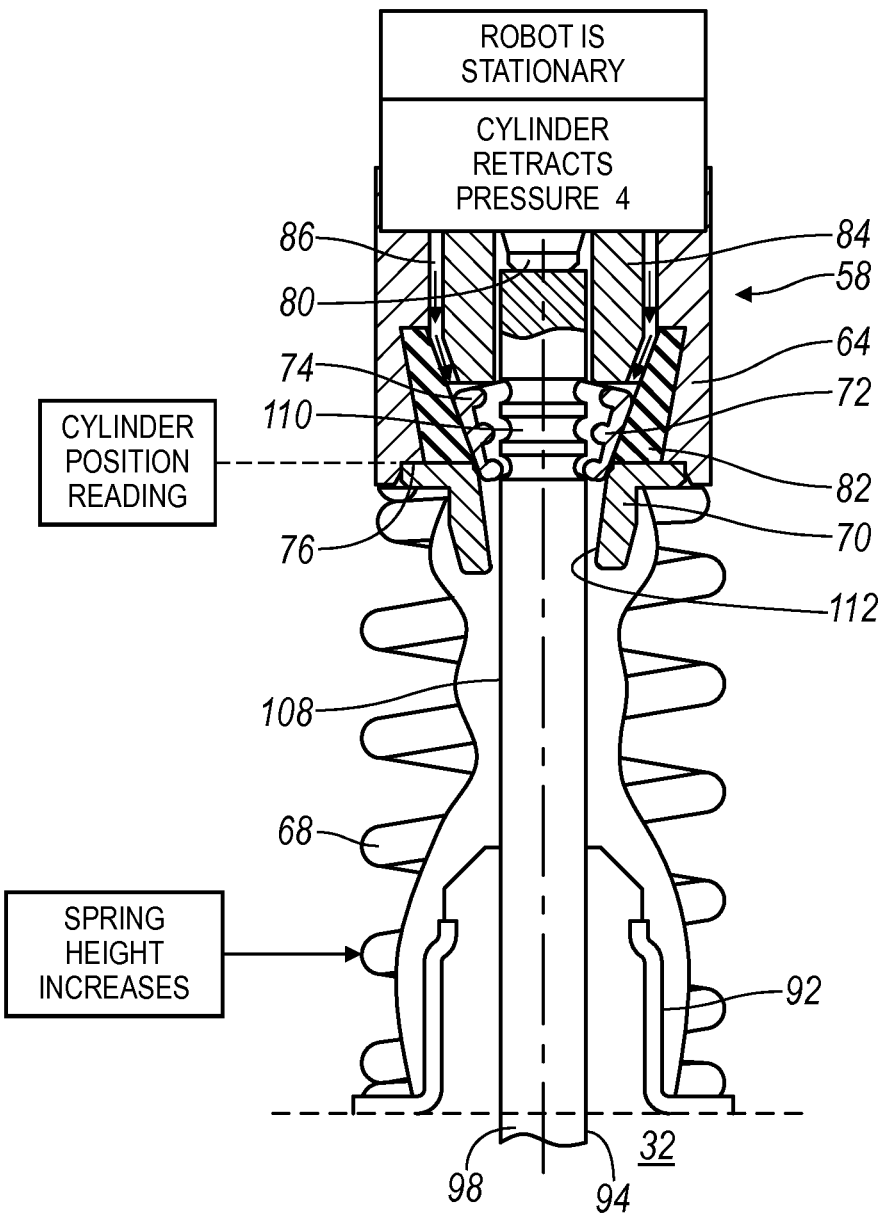
FIG. 11 is another partial section view of the gripper assembly, kit and cylinder-head assembly of FIG. 8, illustrated in another assembly position.

In FIG. 11, the linear actuators 62 of the key-up tooling subassembly 58 are retracted by reducing the pressure to Pressure 4, which is less than Pressure 3. Each valve spring 68 expands during the retraction, thereby pressing the corresponding spring cap 70 toward the retainer keys 72. The pressurized air is maintained upon the retainer keys 72 to urge the retainer keys 72 into cooperation with the valve stem 108. Otherwise misalignment may be caused, such as by oil upon the retainer keys 72 adhering the retainer keys 72 to the center bushing 84, center pin 80 or the seal 82. During the retraction, beads 74 upon the retainer keys 72 align with grooves 110 in the valve stems 108.

Figure 12:
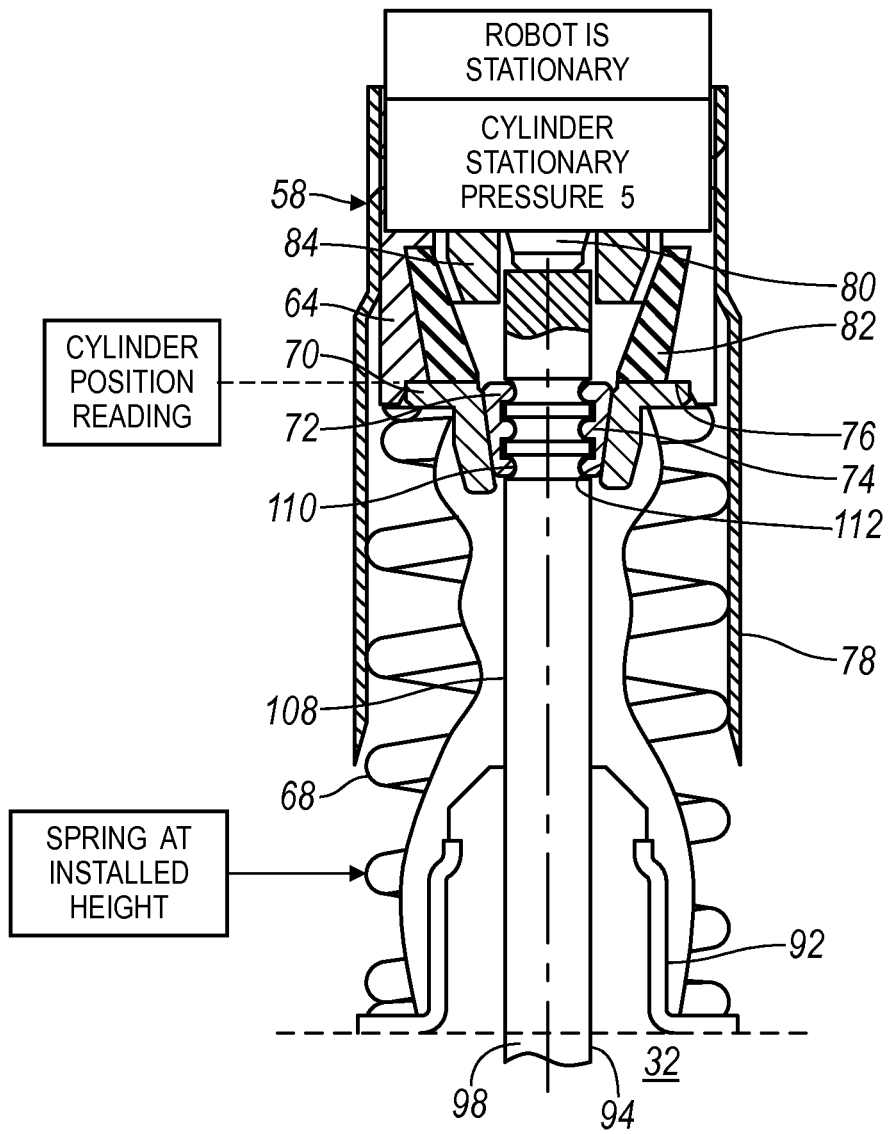
FIG. 12 is another partial section view of the gripper assembly, kit and cylinder-head assembly of FIG. 8, illustrated in yet another assembly position.

In FIG. 12, the linear actuators 62 continue to retract by reducing the cylinder pressure to Pressure 5, which is less than Pressure 4. As the valve spring 68 presses the spring cap 70 into the retainer keys 72, a tapered aperture 112 in the spring cap 70 causes the retainer keys 72 to converge into locked engagement with the beads 74 in the grooves 110 on the valve stem 108. In the locked arrangement, the valve spring 68 is still partially compressed thereby maintaining the locked engagement and completing the assembly of the valvetrain.

Unlike the prior art, the cylinder-head 32 is maintained in one position during assembly of the valvetrain, thereby avoiding additional manufacturing equipment, manufacturing steps, and plant floor space. The secondary robot 36 maintains the valves 98 in the installed position during assembly of the spring caps 70 and retainer keys 72, thereby avoiding any additional hardware or automation to maintain the seated position of the valves 98. The compactness of the key-up tooling subassembly 58 permits installation of the kits 66 without removing camshaft caps from the cylinder-head 32, which further simplifies manufacturing equipment, manufacturing steps, and plant floor space.

Figure 13:
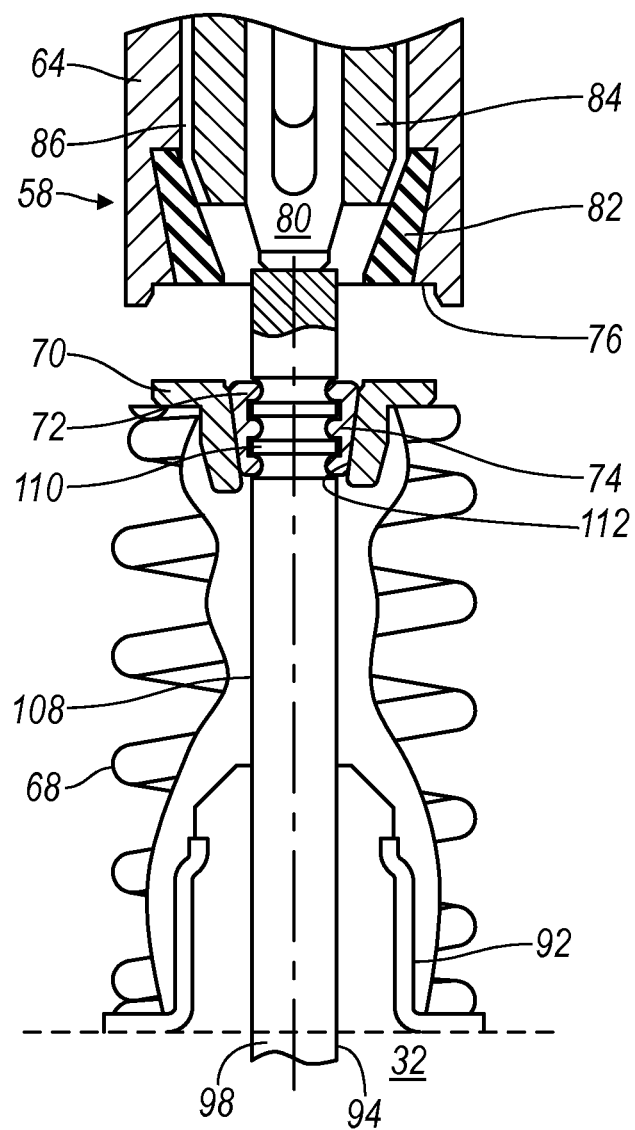
FIG. 13 is another partial section view of the gripper assembly, kit and cylinder-head assembly of FIG. 8, illustrated in a first test position.
Figure 14:
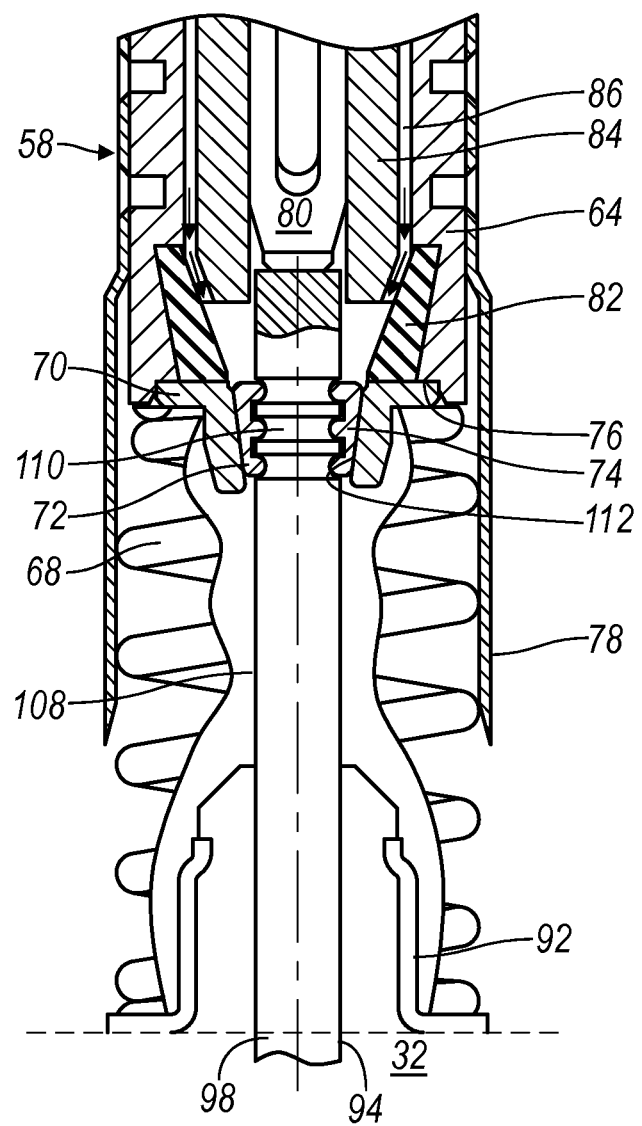
FIG. 14 is another partial section view of the gripper assembly, kit and cylinder-head assembly of FIG. 8, illustrated in another test position.

Cylinder-head assemblies are often inspected by automation to determine if the valvetrain is properly assembled. Such inspection is often performed by additional equipment, which may even add an additional cell to the assembly line. In contrast, the key-up tooling subassembly 58 is configured to perform the inspection from a position approximate to the completion of assembly of the valvetrain to minimize additional cycle time. In FIG. 13, the key-up tooling subassembly 58 is translated towards the cylinder-head 32 until the center pin 80 contacts the valve stem 108. In FIG. 14, the key-up tooling subassembly 58 is further translated until the seal 82 engages the spring cap 70. The pressurized air is maintained and measured during these steps.

Figure 15:
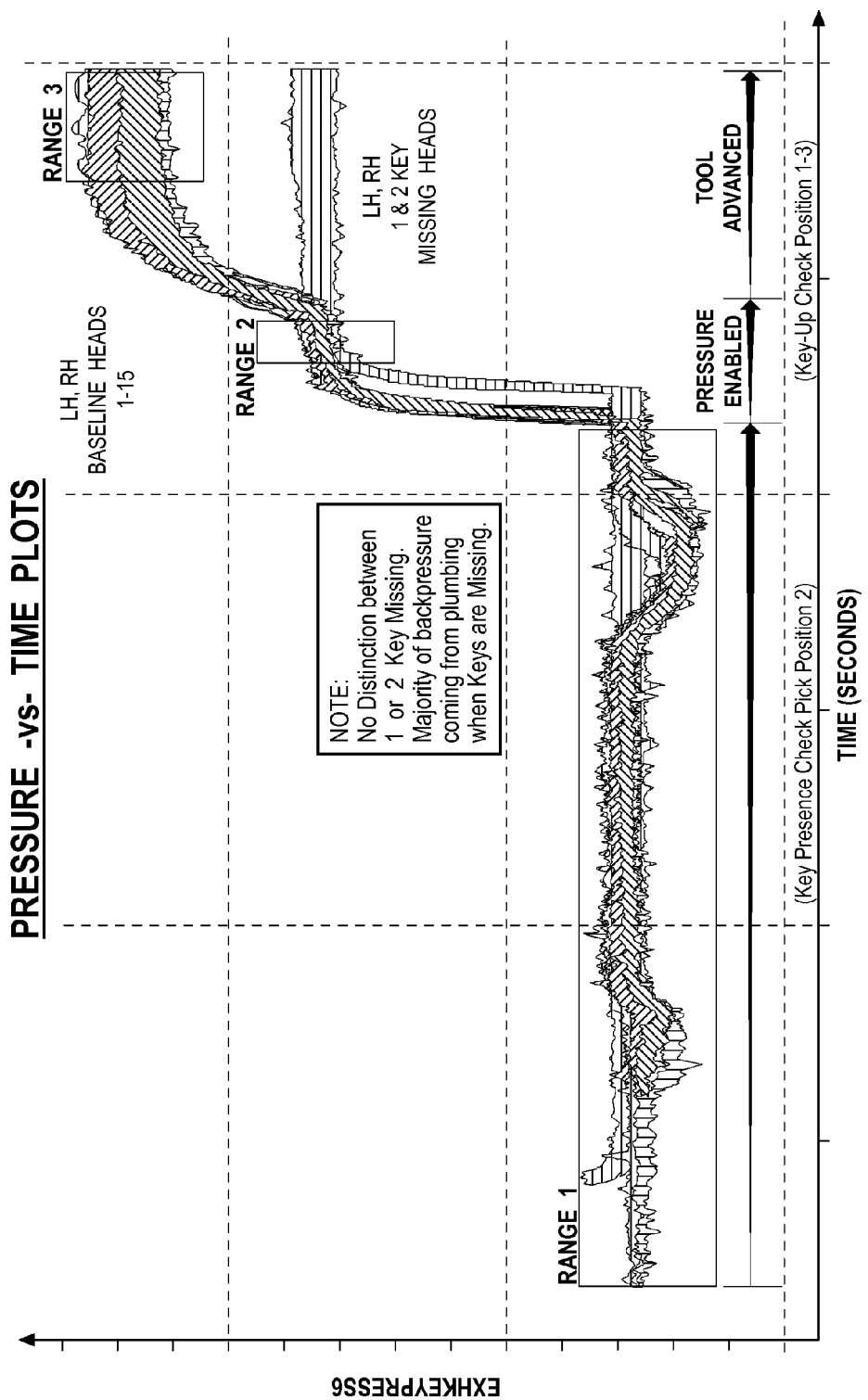
FIG. 15 is a graph of pressure over time for testing installation of the retainer keys.

FIG. 15 illustrates a graph with time on the abscissa and pressure on the ordinate. Range 1 illustrates a back pressure of the tooling, which may be a positive pressure or a negative pressure for vacuum systems as known in the art. Range 2 is measured as the pressure is enabled. Range 3 is measured during the inspection. If the retainer keys 72 are properly installed, the pressure of the air increases over time. If one or both retainer keys 72 are not installed, the pressure does not increase over time. Therefore, a failure can be detected immediately after installation before full retraction of the key-up tooling subassembly 58. The inspection value at Range 3 is compared to the Range 2 to determine proper installation of the retainer keys 72. Back pressure of tooling and its associated plumbing may vary over time. Therefore, the difference between Range 3 and Range 2 is utilized to determine whether there is a proper installation. Likewise, the difference between Range 2 and Range 1 is utilized to determine if there is an improper installation. Utilization of the difference in ranges compensates for variations in back pressure.

Cylinder-heads, such as the cylinder-head 32 depicted herein, include intake and exhaust valvetrains. After installation of one valve train, such as the intake valvetrain assembly process described above, the automated fixture 38 pivots the table 52 to a second orientation whereby the exhaust valve guides are oriented vertically, which is perpendicular to the reaction beam 90. Then the assembly steps for the intake valvetrain are repeated for the exhaust valvetrain by utilizing exhaust valves 114.

For V-configured engines with left and right cylinder-heads, the assembly cell 24 is flexible for assembling the valvetrain components for both cylinder-heads. The assembly cell 24 can assemble various configurations of cylinder-heads by interchanging the tooling that is specific to a particular configuration.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly method comprising:
orienting a cylinder-head at a first orientation;
inserting a first plurality of spring caps and a first plurality of retainer keys into the cylinder-head in the first orientation by a first robot;
inserting a first plurality of valves into the cylinder-head in the first orientation by a second robot, into engagement with the first plurality of retainer keys;
pressing the first plurality of spring caps to compress a first plurality of valve springs before inserting the first plurality of valves; and
after inserting the first plurality of valves, partially retracting the first robot thereby expanding the first plurality of valve springs and thereby aligning the first plurality of retainer keys with grooves upon shafts of the first plurality of valves.

2. The assembly method of claim 1 further comprising maintaining the first plurality of valves in an installed position with the second robot during partial retraction of the first robot.

3. The assembly method of claim 1 further comprising verifying the insertion of the first plurality of retainer keys with the first robot prior to full retraction of the first robot.

4. The assembly method of claim 1 further comprising:
orienting a combustion surface of the cylinder-head facing toward an underlying support surface; and
rotating the cylinder-head so that a first plurality of valve guides are generally perpendicular to the underlying support surface to orient the cylinder-head in the first orientation.

5. The assembly method of claim 1 further comprising:
orienting the cylinder-head at a second orientation that is different from the first orientation;
inserting a second plurality of spring caps and a second plurality of retainer keys into the cylinder-head in the second orientation by the first robot; and
inserting a second plurality of valves into the cylinder-head in the second orientation by the second robot, into engagement with the second plurality of retainer keys.

6. The assembly method of claim 1 further comprising inserting a first plurality of valve springs with the first plurality of spring caps and the first plurality of retainer keys by the first robot.

7. The assembly method of claim 6 further comprising providing a reaction force to the first robot during compression of the first plurality of valve springs during the insertion of the first plurality of spring caps and the first plurality of retainer keys.

8. The assembly method of claim 1 further comprising not removing a plurality of cam caps during the insertion of the first plurality of spring caps, the first plurality of retainer keys and the first plurality of valves.

9. The assembly method of claim 5 further comprising:
orienting a combustion surface of the cylinder-head facing toward an underlying support surface; and
rotating the cylinder-head so that a second plurality of valve guides are generally perpendicular to the underlying support surface to orient the cylinder-head in the second orientation.

10. The assembly method of claim 5 further comprising inserting a second plurality of valve springs with the second plurality of spring caps and the second plurality of retainer keys by the first robot.

11. The assembly method of claim 5 further comprising not removing a plurality of cam caps during the insertion of the second plurality of spring caps, the second plurality of retainer keys and the second plurality of valves.

12. The assembly method of claim 5 further comprising:
pressing the second plurality of spring caps to compress a second plurality of valve springs before inserting the second plurality of valves; and
after inserting the second plurality of valves, partially retracting the first robot thereby expanding the second plurality of valve springs and thereby aligning the second plurality of retainer keys with grooves upon shafts of the second plurality of valves.

13. The assembly method of claim 12 further comprising maintaining the second plurality of valves in an installed position with the second robot during partial retraction of the first robot.

14. The assembly method of claim 12 further comprising verifying the insertion of the second plurality of retainer keys with the first robot prior to full retraction of the first robot.

15. The assembly method of claim 12 further comprising providing a reaction force to the first robot during compression of the second plurality of valve springs during the insertion of the second plurality of spring caps and the second plurality of retainer keys.

16. A method comprising:
inserting, by a first robot, spring caps and retainer keys into a cylinder-head in a first orientation;
pressing the spring caps to compress valve springs before insertion of valves into the cylinder-head;
inserting, by a second robot, the valves into the cylinder-head in the first orientation, to engage the retainer keys; and
retracting the first robot thereby expanding the valve springs and aligning the retainer keys with grooves on shafts of the valves.

17. The method of claim 16 further comprising maintaining the valves in an installed position with the second robot during the retraction of the first robot.

18. The method of claim 16 further comprising verifying the insertion of the retainer keys with the first robot; and
fully retracting the first robot after verifying the insertion of the retainer keys with the first robot.

19. The method of claim 16 further comprising:
orienting a combustion surface of the cylinder-head facing toward an underlying support surface; and
rotating the cylinder-head so that valve guides of the cylinder-head are generally perpendicular to the underlying support surface to orient the cylinder-head in the first orientation.

20. The method of claim 16 further comprising inserting valve springs with the spring caps and the retainer keys by the first robot.

21. The method of claim 16 further comprising providing a reaction force to the first robot during compression of the valve springs during the insertion of the spring caps and the retainer keys.

22. The method of claim 16 further comprising not removing a plurality of cam caps during the insertion of the spring caps, the retainer keys and the valves.

* * * * *